United States Patent [19]

Bristowe et al.

[11] Patent Number: 4,816,526
[45] Date of Patent: Mar. 28, 1989

[54] POLYIMIDE/POLYETHERIMIDE RESIN BLENDS

[75] Inventors: William W. Bristowe; Hong C. Kim, both of Wilmington, Del.

[73] Assignee: ICI Americas Inc., Wilmington, Del.

[21] Appl. No.: 939,556

[22] Filed: Dec. 8, 1986

[51] Int. Cl.[4] ............................................. C08L 79/08
[52] U.S. Cl. ..................................... 525/422; 525/436
[58] Field of Search ................................ 525/422, 436

[56] References Cited

U.S. PATENT DOCUMENTS 4,275,185  6/1981  Lu ........................................ 528/170
4,468,506  8/1984  Holub et al. ........................ 525/436

Primary Examiner—Melvyn I. Marquis
Assistant Examiner—A. Carrillo

[57] ABSTRACT

Polyimide copolymers which are reaction products of active methylene compounds and N,N'-bismaleimide derivatives are improved by incorporating them with 2-20% by weight of a polyetherimide polymer having arylimide bonds, arylene bonds and ether bonds. The polymer blend is useful in films, moldings, prepregs, laminates and filled composites which are particularly useful in structural components which have stability at high temperatures.

4 Claims, No Drawings

POLYIMIDE/POLYETHERIMIDE RESIN BLENDS

This invention relates to a novel resin blend for use in structural composites and particularly to blends of aromatic polyetherimide polymer resins with particular types of polyimide prepolymer resins which are reaction products of bismaleimides with active methylene compounds. These compositions are used to make high performance molding powder, molded articles, and prepegs especially useful in reinforced laminates.

Fiber reinforced composites have found increasing use as a replacement for metal and other structural material especially in the automotive and aerospace industries due to their high strength and low weight. Epoxy polymers have been employed as matrix resins generally used in high performance composites. Carbon fiber/epoxy composites are routinely used for secondary structural applications in contemporary aircraft. However, epoxy polymers typically exhibit poor strength at elevated temperatures after aging in humid environments, i.e. they exhibit depressed glass transition temperatures (Tg), especially after thermal cycling under very humid conditions.

Polyimide resins have been used to impregnate fiberglass cloth to form electric circuit boards which have excellent resistance to high temperature decomposition, a low thermal expansion and retain a high level of electrical resistivity. However, these boards are relatively expensive in comparison with similar circuit boards made from epoxy polymers. Circuit boards of epoxy impregnated fiberglass sheets are not resistant to high temperature degradation and have poor electrical properties and undergo higher level thermal expansion in comparison with similar circuit boards of polyimide resin.

The compositions of this invention are derived from combinations or blends of aromatic polyetherimide polymers and their copolymers with particular types of polyimide prepolymer resins wherein the improved properties offered by each resin is emphasized while their disadvantages are minimized. The blends of the invention are useful in the manufacture of prepegs which comprises a web of a fibrous material coated or impregnated with the blend. Preferably the web consists of structural reinforcement such as carbon, graphite, boron, stell, aramid, silicon carbide or glass fibers and the like. Fiber reinforced compositions of the invention are particularly improved in flowability, i.e. they require relatively low molding pressures at temperatures of 177° C., are non-flammable, have low smoke and toxicity, have improved impact strength and repairability, are improved in hot/wet compression and moisture resistance, and have thermal and mechanical stability.

The resin blends of the present invention comprise mixtures of two polymers, one having a substantial amount of the repeating units of an arylene bond, an ether-arylene bond and an arylimide bond and the other an ethylenically unsaturated imide prepolymer which is a reaction product of an active methylene compound and a bismaleimide. The blends consist essentially of 2-20% by weight of the polyetherimide containing resin blend. Additional compatible resins may be included to improve specific physical properties.

Polyimide Prepolymers

Polyimides which are reaction products of bismaleimides and active methylene compounds are a relatively new class of polyimides and have been described by Lu in U.S. Pat. No. 4,275,185. These polyimide prepolymers are derived from bismaleimides formed by reacting 2 mols of maleic anhydride with an organic diamine to provide a monomer having the general formula I (see table of formulas) wherein X is a divalent organic radical and R is independently selected from the group consisting of H, F, Cl, Br, $CF_3$ and an alkyl group having 1-4 carbon atoms. The bismaleimide is then reacted with an active methylene compound having the general formula $R^1R^2CH_2$ wherein $R^1$ is a monovalent radical selected from the group consisting of —CN, —$NO_2$, —CO—$OR^3$, —$CONH_2$, —$CO_2H$, —$COC_6H_5$, —CO—H, —CO—$R^3$, —CO—Cl, —$SO_2C_6H_5$ wherein $R^3$ is an alkyl group having 1 to ;b 4 carbon atoms and $R^2$ is a monovalent radical selected from the group consisting of $R^1$ and H, —$CH_3$, —$C_6H_5$, —Cl, —F or —$C_6H_4Z$ where Z is —H, —$CH_3$, and lower alkyl, Cl, —Br or —F. Prepolymers formed in this reaction have the general formula II wherein n is an integer and Y is $R^1R^2C=$. N,N'-Bis-maleimides of formula I used in the reaction are well known in the prior art and may be conventionally prepared from maleic anhydride as described in U.S. Pat. No. 2,444,536. The N,N'-bismaleimide most useful are those wherein R is independently selected as previously described and wherein X is a divalent organic radical which may be an organic radical including aliphatic, aromatic hydrocarbon radicals such as arylene, alkylene, alkarylene and aralkylene, and lower alkylene substituted and halogenated derivatives thereof. Preferred bismaleimides for use in this invention are those wherein X contains from 1 to 20 carbon atoms. Illustrative of examples of X include methylene, ethylene, propylene, butylene, hexamethylene, decamethylene, phenylene, bisphenylene, toluene, ditoluene, xylene, diphenylmethane, alkyl substituted diphenylmethane such as tetramethyldiphenylmethane, diphenylpropylene, diethyldiphenylmethane, napthlene and alkyl derivatives thereof methylene dicyclohexylene anthracenediol, sulfodiphenylene, oxybismethylenephenylene, carbonyldiphenylene, oxydiethylene, oxydiphenylene, chlorohexylmethylenetetrachloroparaphenylene, cyclohexylene and isophorone. A particularly preferred class of bismaleimides for the preparations of polyimide polymers having the best thermal stability are those wherein X contains an aromatic group of the general structure —$C_6H_4$—Q$C_6H_4$— where Q is selected from the group consisting of —$CH_2$—, —O—, —$SO_2$— and —CO—.

The active methylene compound employed in making the polyimides are well known and have the formula $R^1R^2CH_2$ wherein $R^1$ and $R^2$ are as previously defined. The activated methylene hydrogens react with carbon carbon double bounds to form active methylene terminated or ethylenically unsaturation terminated polyimide prepolymers. Examples of activated methylene compounds which may be used to form the polybismaleimide prepolymers include: malononitrile, α-alkylaminoacetonitrile, phenylacetonitrile, α-carboxyacetonitrile, α-diphenylsulfonylacetonitrile, α-carboalkoxyacetonitrile, 1,4-bis(cyanomethyl)benzene, α-halocarbonylacetonitrile, α-chloroacetonitrile, nitroalkanes, acetoacetone, diethylmalonate, 2,4-pentandione, dialkylacetoacetate and dibenzoylmethane.

These polyimide prepolymers may be made by reacting the bismaleimide/active methylene compound at temperatures ranging from 0°–170° C. preferably 10°–120° C. neat or in solvent solution in the presence of catalysts. Phenolic solvents such as phenol, o-cresol, m-cresol, p-cresol, xylenols, chlorophenols, 2-bromo-4-methylphenol and the like are useful. Polar solvents include such materials as dimethylformamide, dimethylacetamide, 1-methyl-2-pyrrolidone, dimethylsulphoxide or cyclohexanone. Acid solvents such as formic acid, acetic acid, proprionic acid, sulphuric acid, hydrochloric, nitric or phosphoric acids may be employed.

Polymers of the active methylene compound/bismaleimide may be formed by reacting the respective ingredients in molar proportions either greater or less than 1:1. A bismaleimide/active methylene mol ratio of the range between 1:1 and 1:0.5 are preferred.

The following preparative examples serve as non-limiting illustrations of the types of polyimie copolymers which can be employed in the invention and unless otherwise indicated all proportions are on a weight basis.

Preparation A. 1433.4 g (4.0 mols) of N,N'-(methylene-di-p-phenylene)bismaleimide and 1800 ml of dimethylformamide are placed in a 5 liter three neck flask and heated to 70° C. When the solution is complete, 257.7 ml glacial Acetic acid is added followed by 185 g (2.8 mols) of malononitrile which is washed into the flask with 87.9 ml of dimethylformamide. A brief exothermic reaction occurs until 98° C. temperature results. The solution is stirred to about 70° C. for 1.25 hours at which time the viscosity became about 6.0 poise as measured by an ICI Cone and Plate Viscometer. The polymer solution is then cooled. Polyimide is obtained by precipitating the resin with stirring into methylethylketone followed by filtering, washing with methylethylketone and drying. This material is hereinafter referred to as 10/7 bis maleimide/malononitrile resin or (10/7 resin).

Preparation B. According to the procedure outlined in Preparation A bismaleimide is reacted with malononitrile in mol ratios of 10/3. This material hereinafter referred to as 10/3 bismaleimide/malononitrile resin (10/3 resin).

Preparation C. According to a procedure outlined in Preparation A bismaleimide is reacted with 2,4-pentandione in mol ratios of 10/7. This material is hereinafter referred to as 10/7 bis maleimide/pentandione resin (10/7PD resin).

Polyetherimide Polymers

Polyaryl ethers containing aryl imide groups are generally referred to as polyetherimides (PEI). These polymers exhibit three important characteristics such as outstanding melt flow for a high-heat material, demonstrated repeatedly in sections as thin as 10 mls; melt stability which provides a processing window of over 150° F. with no degradation and potential for multiple regrind utilization; and ability to be converted in all common polymer processes including injection molding, blow molding, foam molding and extrusion. The tensile strength of these materials exceeds 15,000 psi and their ductility and practical impact strength can be compared with those of other high performance polymers. These materials retain their structural properties at elevated temperatures because they have glass transition temperatures (Tg) ranging from 178°–277° C. Surprisingly it has been found that the addition of PEI to the above described polyimides improves a combination of properties such as resin flow during molding, cure shrinkage (less shrinkage), transverse flexual strength and strain, impact resistance, and interlaminar toughness. Such improvements are obtained when PEI is blended with the above described polyimides in concentrations ranging from 0.5–20% and a preferred 2–10% by weight based on the total weight of the resin blends.

Suitable polyetherimide polymers useful in the preparation of the improved compression, autoclave, and resin transfer moldable copolymer blend comprises a linear polymer containing three kinds of unit bonds consisting of an arylene bond, an ether bond, and a arylimide bond. Representative examples of these aromatic polyetherimide resins include those having a substantial amount of repeating units having general formulas III, IV, V and VI as shown in the table of formulas wherein Ar is a divalent benzene ring in most instances but may be interpreted as including a biphenyl, tetraphenyl, diphenyl alkylene such as 2,2-diphenylpropane, naphthalene, indene or fluorene divalent residues and may be substituted with substituents which do not interfere with the preparation of the polyaryl imide polymer. Polymers such as those of the table of formulas which are derivatives of bisphenol A, phthalic anhydride and phthalimide similar to the general structure IV are available under the trade mark Ultemo ® from General Electric.

In many applications the polymer compositions of the present invention may be used with few if any additives other than stabilizers. However, other additives may be incorporated into the polymer composition. A wide range of additives have been proposed for use in polymer compositions and many of these additives may be incorporated into the polymer compositions of the present invention and for convenience hereinafter the term filled polymer composition will be used to mean the polymer composition of the present invention which also contains an additive. The filled polymer composition can include for example inorganic and organic fibers and fillers such as glass fiber, carbon fiber, nylon filaments, organic and inorganic fillers such as polytetrafluoroethylene, graphite, boron nitride, mica, talc, vermiculite, nucleating agents and stabilizers for the various polymer components.

It is preferred that the total portion of the additives when present is at least 0.1% and does not exceed 80% by weight of the filled polymer composition and especially that the proportion of additives does not exceed 70% by weight. The filled polymer composition can contain 5–30% by weight of boronitride or short glass or carbon fibers, or 5–70% by weight of continuous glass or carbon fiber or a mixture of fluorine containing polymer, graphite and an organic or inorganic containing fiber filler wherein the total proportion of these additives is preferably at least 20% but not more than 80% by weight of the filled polymer composition. A particular interest is sized fiberglass mats or graphite fiber mats or cloth which are coated with a substantial amount of the polymer composition of the invention to form prepegs which can be further shaped and laminated to one another to form multi-layer laminates having improved physical properties at high temperatures.

The polyetherimide used in the invention can be obtained by any of the methods well known to those skilled in the art including the reaction of any aromatic bis(etheranhydride) by a process described in U.S. Pat. No. 4,587,299 which is herein incorporated by reference. The polyetherimides can also be synthesized by nitrodisplacement of bis(imides) with bisphenol salts in dipolar aromatic solvents such as described by T. Takoshi, et al, *Polymer Sci., Polym. Chem. Ed.,* 18 3069(1980) and D. M. White et al. *Polymer Sci., Polym. Chem. Ed.,* 19 1635(1981); and U.S. Pat. No. 3,420,697.

The polymer compositions of the present invention may be made by a mixture of the polymer components in a suitable mixing machine to effect blending by powder or melt blending. More specifically the two polymer components in the form of dry powders or granules can be mixed together using a suitable solids blending technique such as tumble blending or a high speed mixer. The blend thus obtained may be extruded into a lace which is chopped to give granules. The granules can be used to produced shaped particles by the use of suitable forming operations for example injection molding or extrusion to give a shaped article. Blending can also be achieved by forming a solvent solution of the polyimide prepolymer and the polyetherimide and thereafter removing the solvent from the blend. Prepregs containing 20–50% resin and less than 5% residual solvent are useful in making laminates.

Prepegs can be stored in a controlled condition and then used to form a multiplicity of layers, shapes, and compressed at pressures up to 20 MPa (megapascals) at temperatures of 100°–250° C. to form cured laminates.

Filled polymer compositions may be obtained by mixing the additive or additives with the components of the polymer or with granules of the polymer composition. The blended polymers of the invention may be formed into films, foils, or injection molded to form shaped articles or compressed to form laminates. Films, foils, powder or granules of the polymer composition can be laminated with fiber material in the form of mats of cloths. Filled polymer compositions containing fiber filler materials may be obtained by passing essentially continuous fiber, for example glass or carbon fiber through a melt of the polymer composition or a molten mixture containing the polymer composition. The product obtained is a fiber coated with the polymer mixtures. The coated fiber may be used alone or together with other materials for example a further quantity of the polymer composition to form a shaped article by the appropriate shaping method. Coated fiber materials in the form of continuous filaments, mats or cloth maybe coated by treating the fiberous material with a solution containing the polymer composition by soaking the cloth or passing the continuous filament through this solution and thereafter removing the solvent from the treated article.

Additional modifying polymers may be included with the composition of the invention. Thermosetting properties can be improved by the addition of polyepoxides, polyimides, either saturated or unsaturated, polyamides, polycarbonates, arcylic polymers, styrenic polymers or olefinic polymers. The unfilled and filled polymer compositions have properties which make them suitable for high temperature applications where good solvent resistant is also desirable. The polymer blends also have good electrical insulating characteristic and hence are useful for applications requiring such characteristics and particularly in combination with high temperature properties.

In a further application in which the electrical properties of the polymer compositions are beneficial, shaped articles formed from the polymer composites or filled polymer can be used for the production of printed circuit boards since the polymer composites show good resistance to distortion by molten solder.

The following example will serve to illustrate but not limit the improvements offered by the compositions of the invention. All proportions expressed are in parts by weight unless otherwise specified.

Example 1

A 10 g portion of General Electric's Ultem ® polyetherimide was blended with 90 g of 10/7 bismaleimide/pentanedione resin prepared according to preparation C. This blend was charged into a 6"×6" mold at room temperature. The mold was then closed with 1000 psi pressure and heated to 230° C. After 1 hour cure at 230° C. and subsequent slow cooling to room temperature, a resin casting was obtained from this blend. Significant improvements in toughness was noted from this casting compared with the unmodified bismaleimide/pentanedione casting.

TABLE OF STRUCTURES

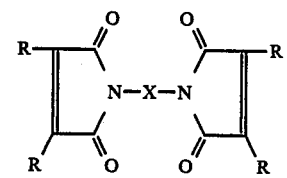

I

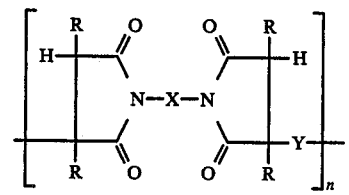

II

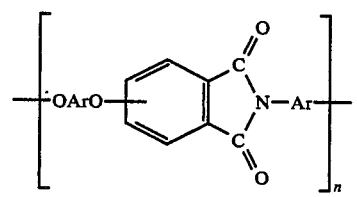

III

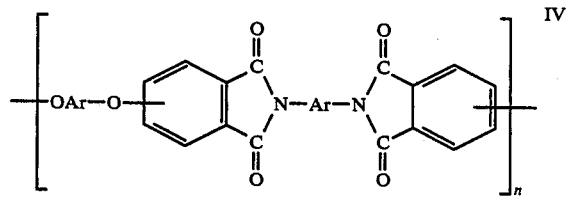

IV

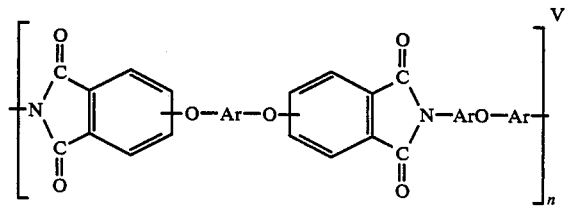

V

TABLE OF STRUCTURES -continued

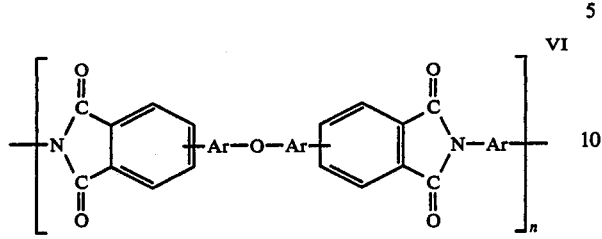
VI

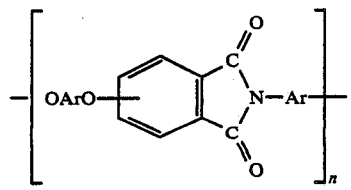
III

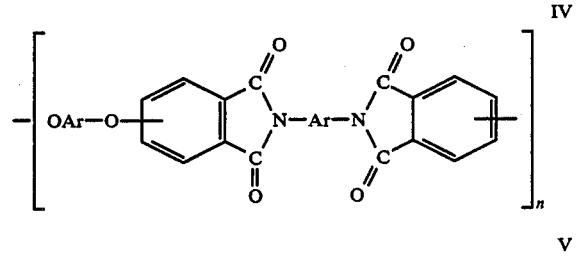
IV

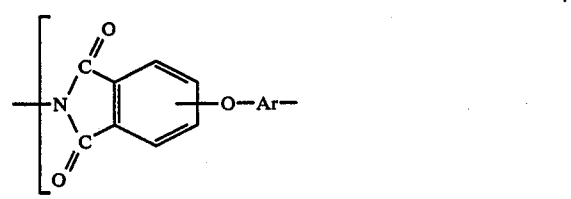
V

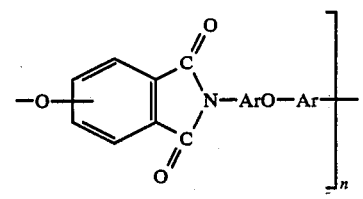

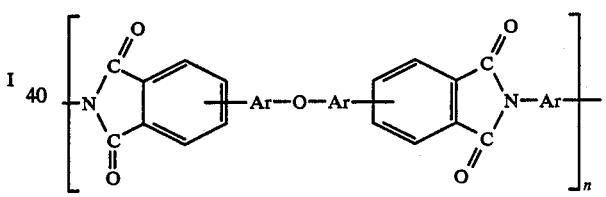
VI wherein Ar is divalent benzene.

What is claimed is:

1. A resin composition comprising an ethylenically unsaturated polyimide prepolymer which is a reaction product of an active methylene compound having the general formula $R^1R^2CH_2$ wherein $R^1$ is a monovalent radical selected from the group consisting of —CN, —NO$_2$—CO, —OR$^3$, —CONH$_2$, —CO$_2$H, —COC$_6$H$_5$, —CO—R$^3$—CO—Cl, and —SO$_2$—C$_6$H$_5$ wherein $R^3$ is an alkyl group having 1–4 carbon atoms; $R^2$ is a monovalent radical selected from the group consisting of $R^1$ and —CH$_3$, —C$_6$H$_5$, —Cl, —F, and —C$_6$H$_4$Z wherein Z is selected from the group consisting of —CH$_3$, a lower alkyl having 1–4 carbon atoms, —Cl, —Br, and —F, with a bismaleimide compound of Formula I

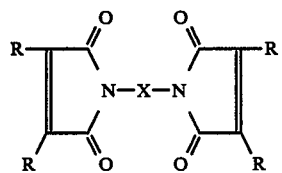
I wherein X is a divalent organic radical and R is independently selected from the group consisting of —H, —F, —Cl, —Br, —CF$_3$ and an alkyl having 1–4 carbon atoms said prepolymer blended with 2–20 percent by weight of a polyetherimide resin which comprises a substantial amount of repeating units of an arylene bond, an ether bond and an arylimide bond having formulas selected from the group consisting of:

2. A composition of claim 1 wherein said polyimide prepolymer is a reaction product of a bismaleimide with an active methylene compound selected from the group consisting of malononitrile, 2,4-pentanedione, and dibenzoylmethane.

3. A composition of claim 1 wherein X in said bismaleimide is selected from the group consisting of phenylene, alkylene and —C$_6$H$_4$—Q—C$_6$H$_4$— and Q is selected from the group consisting of —CH$_2$—, —O—, —SO$_2$ and —CO—.

4. A composition of claim 1 further comprising fibrous reinforcing agents.

* * * * *